(12) United States Patent
Nishimura et al.

(10) Patent No.: US 7,613,895 B2
(45) Date of Patent: Nov. 3, 2009

(54) MEMORY ADMINISTRATING METHOD

(75) Inventors: Hiroyasu Nishimura, Hachioji (JP); Tomohiro Suzuki, Nishitokyo (JP); Yuji Tamura, Hachioji (JP); Tetsuya Ishikawa, Hachioji (JP); Tomoya Ogawa, Hachioji (JP); Fumikage Uchida, Asaka (JP); Nao Moromizato, Hino (JP); Masayuki Yasukaga, Hachioji (JP); Munetoshi Eguchi, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 436 days.

(21) Appl. No.: 11/706,247

(22) Filed: Feb. 15, 2007

(65) Prior Publication Data

US 2007/0271408 A1  Nov. 22, 2007

(30) Foreign Application Priority Data

May 18, 2006  (JP) .............................. 2006-138667

(51) Int. Cl.
  *G06F 12/00*  (2006.01)
(52) U.S. Cl. ........................ 711/170; 711/153; 711/156; 345/543; 345/544; 707/206
(58) Field of Classification Search ................ 711/170, 711/153, 156; 345/543, 544; 707/206
See application file for complete search history.

(56) References Cited

U.S. PATENT DOCUMENTS

| | | | |
|---|---|---|---|
| 6,195,389 B1 * | 2/2001 | Rodriguez et al. | 375/240.16 |
| 6,711,298 B1 * | 3/2004 | Amonou | 382/240 |
| 7,100,009 B2 * | 8/2006 | Schopp | 711/163 |
| 2005/0066143 A1 * | 3/2005 | Schopp | 711/170 |

FOREIGN PATENT DOCUMENTS

| | | |
|---|---|---|
| JP | 04-112249 | 4/1992 |
| JP | 5-12099 | 1/1993 |
| JP | 06-309197 | 11/1994 |

OTHER PUBLICATIONS

Japanese Office Action dated Jan. 31, 2008.

* cited by examiner

*Primary Examiner*—Stephen C Elmore
(74) *Attorney, Agent, or Firm*—Finnegan, Henderson, Farabow, Garrett & Dunner, L.L.P.

(57) ABSTRACT

A memory administrating method of administrating a memory divided into plural regions each of which consists of consecutive memory addresses, where the method includes the steps of: providing each region of the plural regions with usage information; and when releasing a release target region currently in use, determining usage of the release target region based on the usage information of at least one of neighboring regions positioned before and after the release target region.

11 Claims, 9 Drawing Sheets

⬚ .... IN-USE REGION  ▨ .... RELEASE TARGET REGION  ☐ .... UNUSED REGION
FIG. 5 (a) 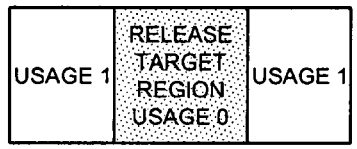  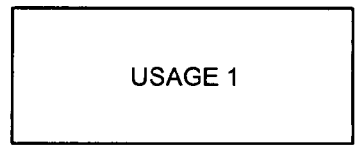
FIG. 5 (b) 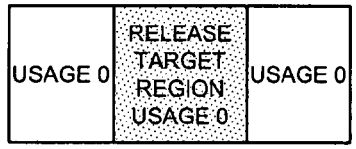  
FIG. 5 (c)   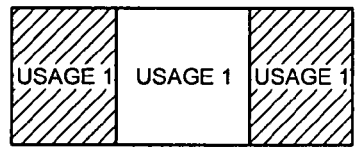
FIG. 5 (d)   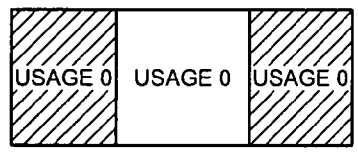
FIG. 5 (e) 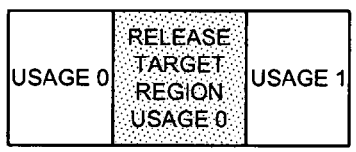  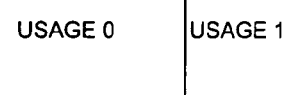
FIG. 5 (f) 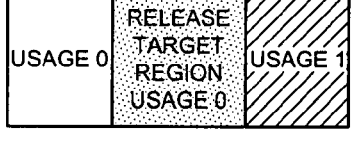  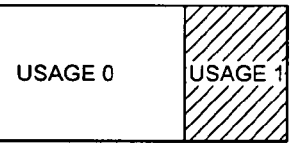
FIG. 5 (g)   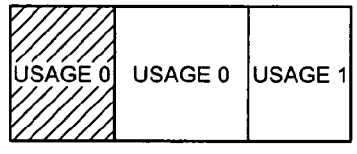

MEMORY ADMINISTRATING METHOD

CROSS-REFERENCE TO RELATED APPLICATION

This application is based on Japanese Patent Application No. 2006-138667 filed on May 18, 2006, in Japanese Patent Office, the entire content of which is hereby incorporated by reference.

BACKGROUND OF THE INVENTION

The present invention relates to a memory administrating method for conducting dynamically acquisition and release of a memory region, particularly to a technique to efficiently share a memory for a plurality of different usages.

To ensure effective use of a memory resource, a computer apparatus adopts a dynamic memory administration in which each processing acquires a region of a required size whenever required, and releases the region after having used the region.

In such a memory administration, there are great differences in the size of the region to be acquired, and the time to release the region. If the process of acquisition and release is repeated, fragmented unused regions (vacant region) will occur and the memory region will be divided into discontinuous fragmented-regions. Thus, a continuous large-sized vacant region cannot be ensured, although a sufficient amount of regions is available as a total region.

In the conventional method, when a region 301 having been used is to be released, a check is made to see if there is any unused region before and after the region 301 to be released, as shown in FIG. 9. If there are unused neighboring regions 302 and 303, the region 301 to be released and the unused regions 302 and 303 are united into one unused region 304 (e.g., Unexamined Japanese Patent Publication No. H5-12099).

When a memory is shared among a plurality of usages having great differences in the region size to be acquired and the time of use before release, there will be a greater possibility to cause fragmented portions and a large-sized continuous region cannot be obtained. For example, the system memory may be shared for use as a region for image processing and a region for normal data processing by software. Since there are great differences in the required region size and time of use before release between the region for image and that for software, the problem of fragmentation will be more serious. Thus, the occurrence of fragmented region cannot be avoided by the conventional memory administrating method of combining unused neighboring regions at the time of releasing.

When hardware is used for the aforementioned image processing by sharing a system memory, the memory region must be administrated on the boundary for the sake of processing on the part of hardware in some cases. In such cases, uniform administration of the system memory on the boundary will result in useless acquisition of the region for software. Thus, effective use of the memory cannot be achieved. Similarly, when the memory is shared among a plurality of pieces of hardware having different fixed length sizes on the boundary, uniform administration of the memory based on the fixed length conforming to any one piece of the hardware will cause the memory to be wasted, when acquiring the region for other pieces of hardware.

SUMMARY OF THE INVENTION

In order to solve these problems, an object of the present invention is to provide a memory administrating method which, even when a memory is used for a plurality of different usages, minimizes fragmentation of the memory and has a high possibility capable of acquiring a large-sized continuous region.

Further, an object of the present invention is to provide a memory administrating method which ensures effective memory assignment even when there are a plurality of usages having differences in the presence or absence of the boundary, or in the fixed length of the boundary.

At least one of the above objects can be attained by a memory administrating method reflecting an aspect of the present invention as described in Item 1.

Item 1. A memory administrating method of administrating a memory divided into plural regions each of which consists of consecutive memory addresses, comprises steps of:

providing each region of the plural regions with usage information; and when releasing a release target region currently being in use, determining a usage of the release target region based on the usage information of at least one of neighboring regions positioned before and after of the release target region.

In the embodiment described in Item 1, usages of memory regions are administrated with the usage information, and when a release target regions is released, the usage of the release target region is determined based on the usage information of at least one of neighboring regions positioned before and after the release target region.

BRIEF DESCRIPTION OF THE DRAWINGS

FIGS. 5(a) to 5(g) each is an explanatory diagram schematically showing, for each case, the states before and after release when the process of release in FIG. 4 has been applied;

DETAILED DESCRIPTION OF THE PREFERRED EMBODIMENT

Figure 1:
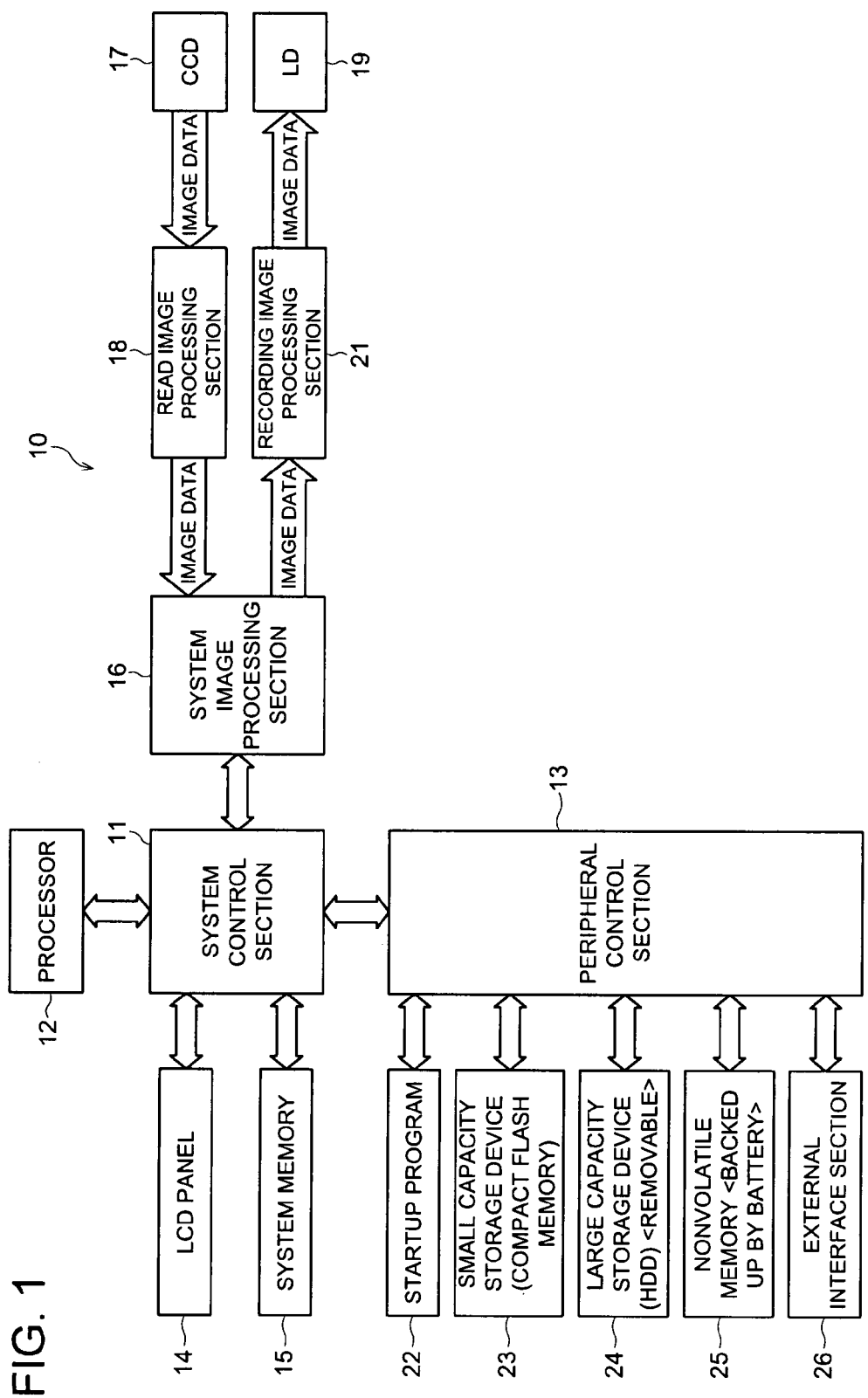
FIG. 1 is a block diagram representing the structure of an image forming apparatus as an embodiment of the present invention.

Hereinafter, preferable embodiments of the present invention are explained, however, the present invention is not limited to these preferable embodiments.

Firstly, preferable memory administrating methods to attain the above objects are explained.

Item 2. In the memory administrating method described in Item 1, the usage of the release target region and a uniting condition to unite the release target region with at least one of the neighboring regions are determined based on the usage information of the neighboring regions and status information indicating at least whether the status of the each memory region is currently "in-use" or "unused".

In the embodiment described in Item 2, usages of memory regions are administrated with the usage information, and when a release target regions is released, the usage of the release target region and a uniting condition to unite the release target region with the neighboring regions are determined are determined based on the usage information and the status information ("in-use" or "unused") of the neighboring regions positioned before and after the release target region.

Item 3. In the memory administrating method described in Item 2, when the usage information of each of the neighboring regions is the same to each other, the usage information of the release target region is made the same usage information with that of the neighboring regions, and the release target region is united with a neighboring region having a status information indicating "unused" among the neighboring regions.

In the embodiment described in Item 3, when the neighboring regions before and after the release target region are used for the same usage, the neighboring regions and the release target region sandwiched between them are set to be used for the same usage. Then, when the neighboring regions are unused or are to be released and become unused in future, they can be united into one region for the same usage. Thus, if the neighboring regions are used for the same usage, the release target region is determined to be used for the same usage, and then is released. When, among the neighboring regions before and after the release target region, there is an unused neighboring region having the same usage as that of the release target region having been determined as above, this neighboring region and the release target region are united into one unused region.

When the neighboring region before and after the release target region are used for different usages, the usage of the release target region need not be modified, and the same usage as that before release should be determined.

Item 4. In the memory administrating method described in Item 2, when the status information of both of the neighboring regions indicates "unused" and the usage information of both of the neighboring regions are the same with that of the release target region, the release target region and the neighboring regions are united as a single unused region, and when the status information of both of the neighboring regions indicates "unused" and the usage information of each of the neighboring regions is the same with each other and is different from that of the release target region, the usage information of the release target region is rewritten so as to become the same with that of the neighboring regions and the release target region and the neighboring regions are united as a single unused region.

In the embodiment described in Item 4, if both the neighboring regions before and after the release target region are unused, and the usages of these neighboring regions are the same with each other, the release target region and the neighboring regions are united into one unused region having one attribute which represents the usages of the neighboring regions. To be more specific, if the usage of the release target region agrees originally with the usages of the neighboring regions, these regions can be united into one unused region. If the usage of the release target region does not agree with the usages of the neighboring regions, the usage of the release target region is modified to the usages of the neighboring regions, and they are united into one unused region.

Item 5. In the memory administrating method described in Item 2, when the status information of both of the neighboring regions indicates "in-use" and the usage information of both of the neighboring regions are the same with that of the release target region, the release target region is released with the same usage information with that before being released, and when the status information of both of the neighboring regions indicates "in-use" and the usage information of each of the neighboring regions is the same with each other and is different from that of the release target region, the usage information of the release target region is rewritten so as to become the same usage information as that of the neighboring regions and the release target region is released.

In the embodiment described in Item 5, if both the neighboring regions before and after the release target region are currently in use, and their usage is the same, the release target region is made as an unused region having the same usage as that of the neighboring regions, and is released without being united with the neighboring regions. To be more specific, if the usage of the release target region agrees originally with the usages of the neighboring regions, the release target region is released with the usage kept unmodified, without being united with the neighboring regions. When the usage of the release target region does not agree with the usages of the neighboring regions, the usage of the release target region is modified into the usages of the neighboring regions, and the release target region is released without being united with the neighboring regions.

Item 6. In the memory administrating method described in Item 2, when the status information of both of the neighboring regions indicates "unused" and the usage information of one of the neighboring regions is the same as that of the release target region and the usage information of the other one of the neighboring regions is different from that of the release target region, the release target region is united with the one of the neighboring regions as a single unused region with the same usage information and the release target region is not united with the other one of the neighboring regions.

In the embodiment described in Item 6, when both the neighboring regions before and after the release target region are unused, and only one of these regions has the same usage as that of the release target region, this neighboring region and the release target region are united into the only one region without the same usage and are released. The release target region is not united with the other neighboring region.

Item 7. In the memory administrating method described in Item 2, when the status information of one of the neighboring regions indicates "unused", the status information of the other one of the neighboring regions indicates "in-use" and the usage information of the release target region is the same with that of the one of the neighboring regions, the release target region is united with the one of the neighboring regions with the same usage information.

In the embodiment described in Item 7, when one of the neighboring regions before and after the release target region is unused, and the other is in use, this unused neighboring region and the release target region are united into one region without the same usage, only when the usage of this unused neighboring region agrees with the usage of the release target region. Then the united region is released. It should be noted that, if the usage of the unused adjacent regions does not agree with the usage of the release target region, the release target region is released without changing the usage, and is not united with other region.

Item 8. In the memory administrating method described in Item 2, the usage of the release target region is determined based on the usage information of the neighboring regions, and thereafter the uniting condition to unite the release target region and the neighboring regions are determined based on the status information of the neighboring regions.

Item 9. In the memory administrating method described in Item 1, when the release target region is released, the release target region is overwritten with specific data when the usage information of the release target region is for image data.

In the embodiment described in Item 9, if the region used for image is released, the released region is automatically overwritten with specific data so that the previous information is destroyed. This arrangement ensures security against information leakage.

Item 10. In the memory administrating method described in Item 1, the memory is divided into plural administration regions based on presence or absence of a boundary or a fixed length size of a boundary, and when obtaining a region from the plural regions, an administration region of a requested region for the region is selected in accordance with a requested size.

In the embodiment described in Item 10, if administration is made based on the structure wherein the memory is divided into a plurality of administration regions according to the information on the presence or absence of a boundary and/or the fixed length of the boundary, the administration region where the required region is assigned is selected in response to the size of the requested region. For example, the selected administration region is where the fixed length of the boundary is equal to or greater than the requested size, and is the minimum.

Item 11. In the memory administrating method described in Item 10, when an unused region having the requested size is not obtainable from the selected administration region, an unused region is obtained from another administrating region in accordance with the boundary of the another administration region.

In the embodiment described in Item 11, if there is sufficient vacant region for the optimum administration region in terms of dimensions, and size assignment cannot be made, the region is assigned from another administration region in response to the boundary of the administration region.

In the memory administrating method of the present invention, when a memory is shared among a plurality of usages having great differences in the region size and the time of use before release as in the case of a region for image and that for software, there is a growing possibility of acquiring a large-sized continuous region, and effective use of the memory for a plurality of usages can be achieved.

Further, when a region for image is to be released, the region is overwritten with specific data. This destroys the information written during the use, and ensures enhanced security against information leakage.

Further, when a region is acquired from the memory divided into a plurality of administration regions containing boundaries, and the administration region for the acquisition source of that region is selected based on the required region size, it is possible to permit shared use between the usage wherein the memory must be administrated on a specific boundary due to the requirements of hardware, and other usages. At the same time, it is also possible to minimize the region wasted by differences in the fixed length due to the boundary and the region size required by other usages. This arrangement ensures effective use of the memory.

The following describes the embodiments of the present invention with reference to drawings:

FIG. 1 shows the structure of the image forming apparatus 10 as an example of the apparatus based on the memory administrating method of the present invention. The image forming apparatus 10 is provided with a copying function of reading the document image, creating a reproduced image thereof on a recording sheet, and outputting the image. The image forming apparatus 10 is mainly structured with a system control section 11 for controlling the operation of the overall system, a processor 12 for performing the computation processing function; and a peripheral control section 13 for controlling various peripheral functions.

The system control section 11 is connected with a processor 12 and peripheral control section 13, as well as an LCD (Liquid Crystal Display) panel 14, system memory 15 and system image processing section 16. The LCD panel 14 is used to accept various operations by the user and to display on various operation screens and guide screen. The system memory 15 stores the operation program of the processor 12, and serves as a work memory for the processor 12 to execute the operation program and as a memory shared to store image data.

The system image processing section 16 is connected with a CCD (Charge Coupled Device) 17 as a device to read the document image through a read image processing section 18. It is also connected with an LD (Laser Diode) 19 of a laser printer method recording section through a recorded image processing section 21. In the document reading operation, the image data outputted from the CCD 17 is subjected to various processes of correction by the read image processing section 18, and is then inputted into the system image processing section 16. After being subjected to various image processing steps by the system image processing section 16, the image data is once stored in the system memory 15 through the system control section 11. In the operation of outputting to a recording sheet, the image data stored in the system memory 15 is read out by the system control section 11, and is imputed into the system image processing section 16, wherein the image data is subjected to various steps of image processing. After that, the image data is outputted to the LD 19 through the recorded image processing section 21.

The peripheral control section 13 is connected with a ROM (Read Only Memory) 22 with a startup program and others stored therein, small-capacity storage device 23, large-capacity storage device 24, nonvolatile memory 25 and external interface section 26. The small-capacity storage device 23 is used to store the control program and programs of a general-usage operating system. In this case, a flash memory is used as a small-capacity storage device 23. When the apparatus is started, the startup program in the ROM 22 is executed. Thus, the program in the small-capacity storage device 23 is executed in the system memory 15 to perform operations.

The large-capacity storage device 24 is structured with a hard disk apparatus and others, and is used to store image data. The nonvolatile memory 25 is used to store various parameters inherent to the apparatus. The external interface section 26 is connected with an external apparatus by various forms of communications method to control communications. For example, the LAN (Local Area Network), USB (Universal Serial Bus) and IEEE 1394 (Institute of Electrical and Electronic Engineers 1394) are used for this connection.

The image forming apparatus 10 has a memory administrating function to control acquisition and release of the memory region for the system memory 15. The memory administrating function is performed when the processor 12 executes the memory administrating program in the control program. In response to the request from other programs, the memory administrating program obtains the memory region of the requested size from the system memory 15, and sends it to the program of the source of request. Further, when a release command for the already obtained region is received from other programs, the relevant memory region is released as an unused region (vacant region).

Figure 2:
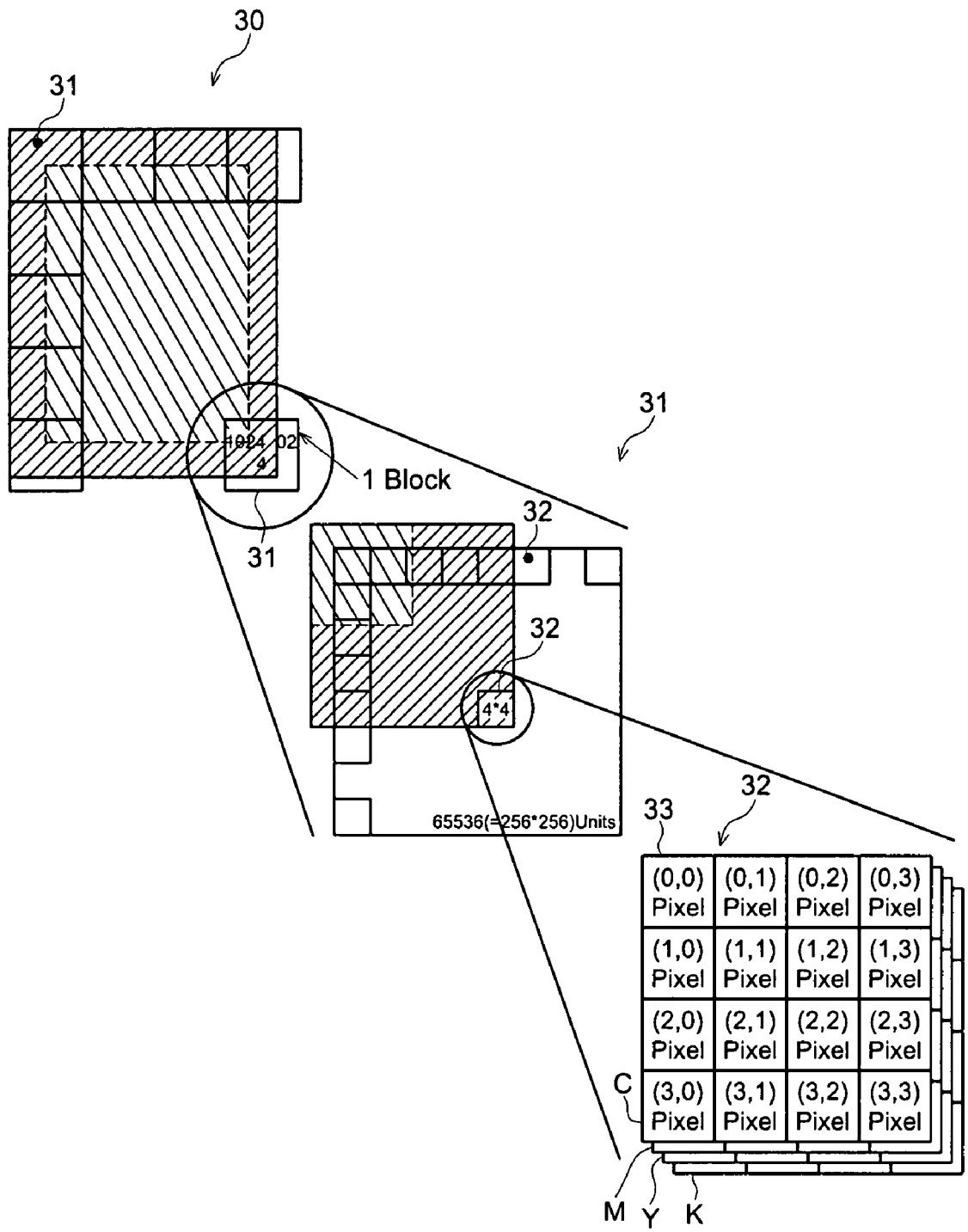
FIG. 2 is an explanatory diagram showing an example of separating the image region into a plurality of blocks for processing in the image forming apparatus as an embodiment of the present invention.

FIG. 2 shows an example of separating the image region into many blocks for processing. As shown in FIG. 2, the image forming apparatus 10 separates the image data into plural blocks for processing. In this example, the image data 30 for one page is separated into a total of 20 blocks obtained by multiplying 5 blocks in the vertical direction with 4 blocks in the horizontal direction. When each unit 32 is structured with an arrangement of 4×4 pixels 33, each of the blocks 31 is structured with a matrix of vertical 256 units by horizontal 256 units. When a color image is handled, each unit 32 contains a region of 4×4 pixels for each of the colors C (cyan), M (magenta), Y (yellow) and K (black). The actual size of the image data is somewhat smaller than the size of the region made up of vertical 5 blocks×horizontal 4 blocks. The peripheral block includes an extra region not used for image data storage.

To ensure that the region for storing the image data is effectively acquired from the system memory 15, it is preferred to acquire a continuous blocks for vertical 5 blocks. The memory region required in this case is for five blocks by 4. If continuous regions can be acquired for five each blocks in this manner, the extra size not used for image data storage in the acquired region is one fifth the size when acquired for each block. Further, when the system memory 15 does not contain a sufficient vacant region, a continuous region in the vertical direction should be acquired whenever possible. For example, if the region for 5 blocks is to be acquired as two separate regions—a region for 3 blocks and a region for 2 blocks, the size of the extra useless region can be reduced to two fifths the size when acquired for each block.

As described above, the memory region used to store the image data is required to have a greater region size than the region used for the work area for the execution of a program by the processor 12.

Figure 3:
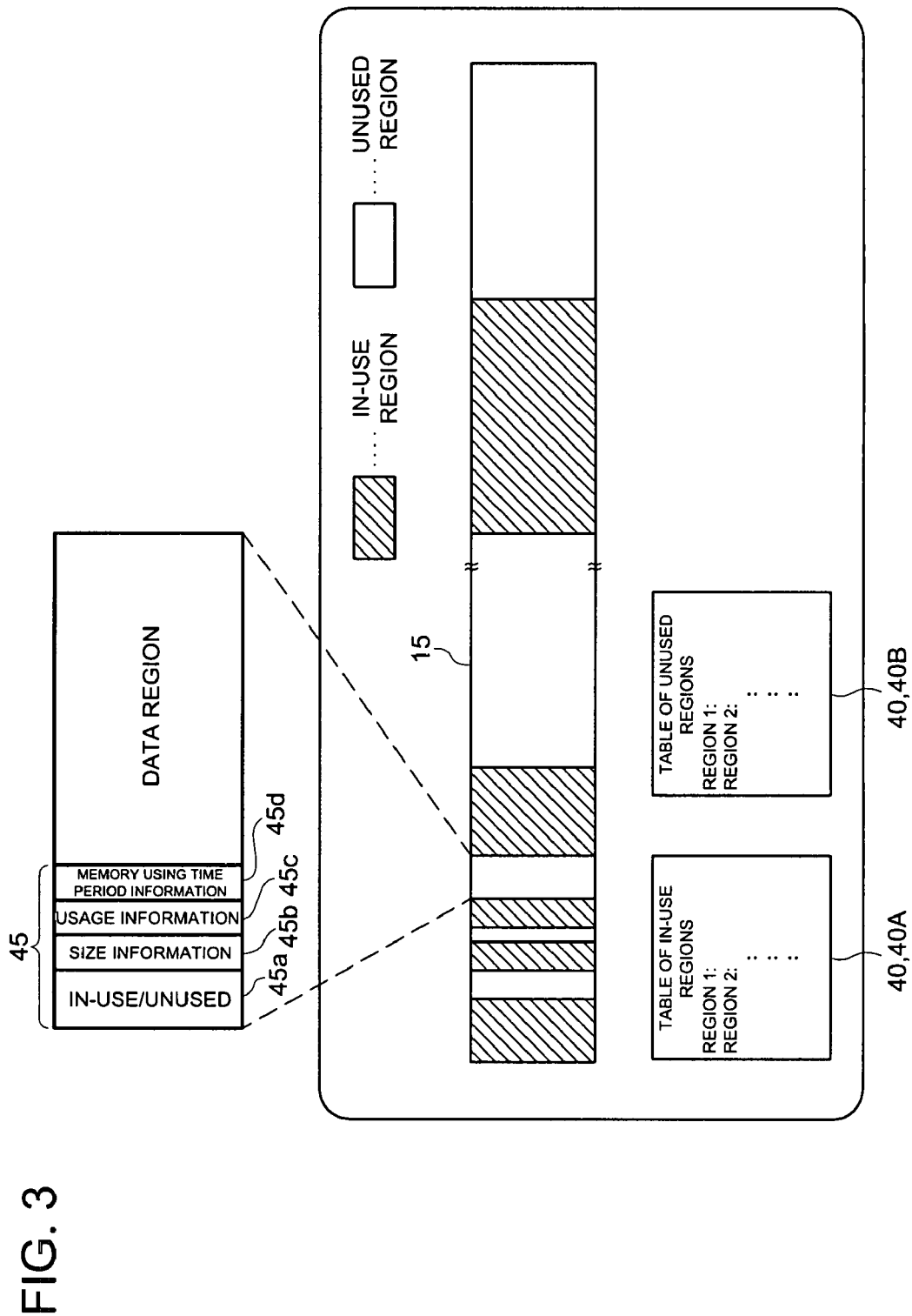
FIG. 3 is an explanatory diagram showing an example of administration information of the memory region.

FIG. 3 shows an example of using the system memory 15 administrated by the memory administrating program, and an example of the memory administration table 40 and header section 45 used to administrate this system memory 15. The hatched area in the drawing indicates the in-use region being currently in use, and the white portion shows the unused region (vacant region). The memory administration table 40 is structured with two tables; a first administration table 40A used to administrate the in-use regions, and a second administration table 40B used to administrate the unused regions. Each of the administration tables 40A and 40B administrates the corresponding region by listing, for example, in the ascending order of the addresses. The administration tables 40A and 40B register the offset value from the leading address of each region or the leading address of the system memory 15.

The leading edges of the in-use region and the unused region are each provided with a header section 45, and this header section 45 contains various forms of administration information on the memory region. Status information 45a showing if the memory region is in use or not, size information 45b showing the region size, usage information 45b showing the usage of each memory region, and memory using time period information 45d showing the time period of using the memory region are registered as administration information.

In this case, "usage information" is defined as information for identifying the usage of the memory region. The usage includes the usage for storing the image data (hereinafter referred to as "for image") and the usage for software used as a work area at the time of storing the program and executing the program.

The "memory using time period information" is defined as the information for identifying the using time period from the acquisition of the memory region to the release thereof. For example, it includes information on the date and time information indicating the date and time of scheduled release, remaining time period before release, and the information showing the time period of usage in terms of a plurality of stages (long, medium, short).

Administration information such as usage information to be registered in the header section 45 can be registered together with the memory administration tables 40A and 40B. Alternatively, administration information on each memory region can be registered in a separate administration table, thereby performing administration.

Figure 4:
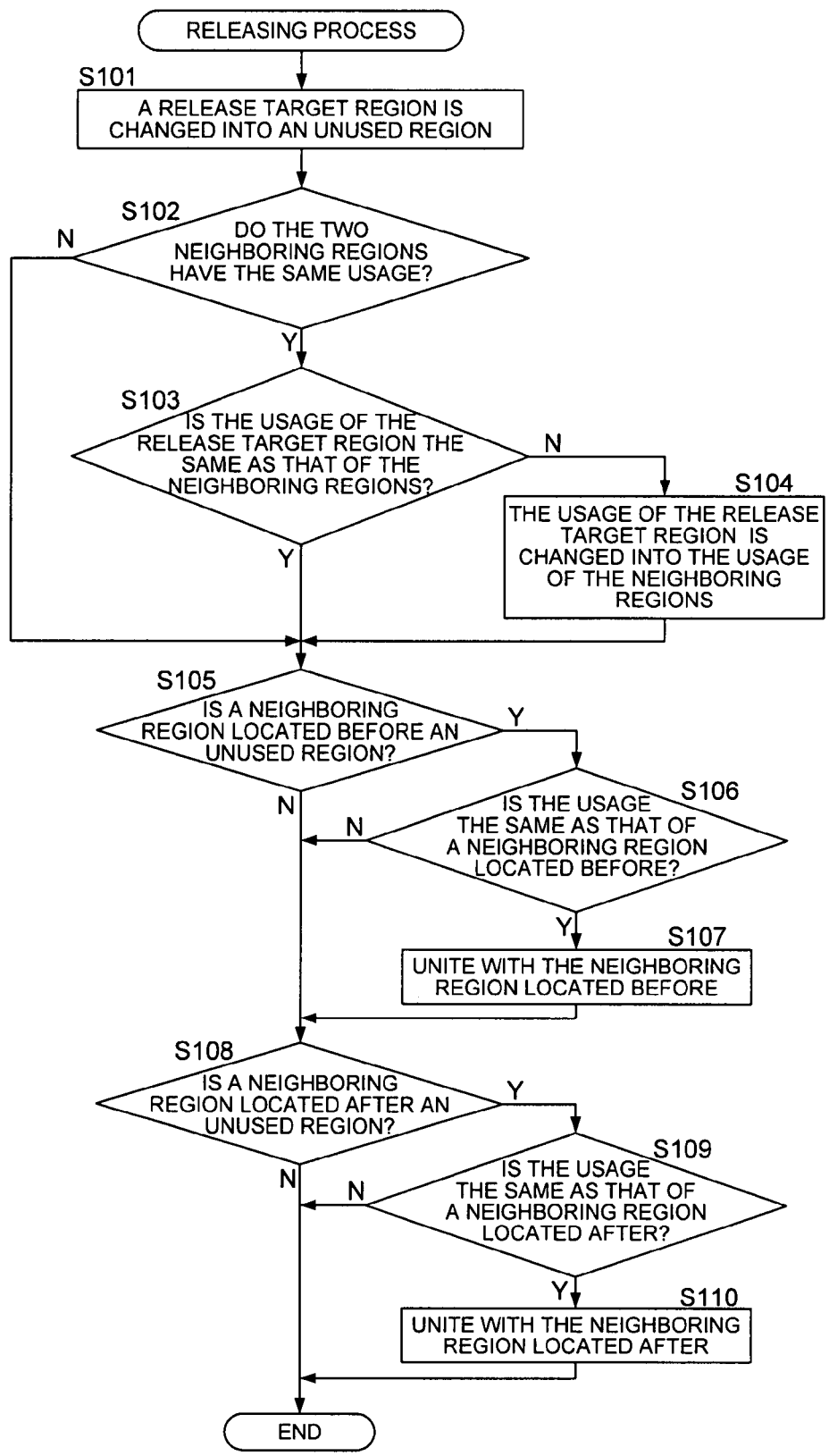
FIG. 4 is a flow chart showing the process of releasing the memory region as an embodiment of the present invention.

The following describes the procedure of releasing the memory region by the memory administrating function of the image forming apparatus 10:

FIG. 4 shows the flow of the process of releasing the memory region. In the process of release, the in-use region to be released is changed into an unused region (Step S101). A decision is made to see whether or not two neighboring regions positioned before and after this release target region at the physical address have the same usage (Step S102). If the purposes of using the neighboring regions are the same with each other (Step S102: Y), a decision is made to see whether or not the usage of the release target region is the same as the usages of the neighboring regions (Step S103).

If the usage of the release target region is different from the usages of the neighboring regions (Step S103: N), the usage of the release target region is changed into the usage of the neighboring regions (Step S104). If the usages of the neighboring regions are the same (Step S102: Y) and these usages are the same as the usage of the release target region (Step S103: Y), and the usages of the neighboring regions are different (Step S102: N), then the usage of the release target region remains as the same usage in use as that before release, without being changed.

If, in the aforementioned processing, the usages of the neighboring regions before and after the release target region are the same, the usage of the release target region is changed into the aforementioned usage of the neighboring regions. If the usages of the neighboring regions are different, the usage of the release target region remains the same as that before release.

Subsequent to the aforementioned processing for changing the usage in use (Step S102 through S104), processing is carried out to unite the unused region. To be more specific, of the neighboring regions before and after the release target region, the neighboring region positioned before is checked to see if it is in use or not (Step S105). If it is an unused region (Step S105: Y), a decision is made to see whether or not the neighboring region positioned before has the same usage of the release target region (the usage in use subsequent to change when having been changed in Step S104) (Step S106). If it has the same usage (Step S106: Y), the neighboring region positioned before is united with the release target region (Step S107). If the neighboring region positioned below has the usage different from the usage of the release target region (Step S106: N) or the neighboring region positioned before is not an unused region (Step S105: N), then the neighboring region positioned before is not united with the release target region.

Of the neighboring regions before and after the release target region, the neighboring region positioned after is checked to see if it is an unused region (Step S108). If it is an unused region (Step S108: Y), a decision is made to see whether or not the usage of the neighboring region positioned after is the same as the usage of the release target region (usage in use subsequent to change when having been changed in Step S104) (Step S109). If it is the same (Step S109: Y), the neighboring region positioned after is united with the release target region (region subsequent to combination if it has been united with the region positioned before in Step S107. This terminates the processing in Step S110 (END).

If the usage of the neighboring region positioned after is different from the usage of the release target region (Step S109: N) or the neighboring region positioned after is not an unused region (Step S108: N), processing terminates (END) without the neighboring region positioned after being united with the release target region (the region subsequent to uniting if united with the region positioned before in Step S107).

FIGS. 5(a) to 5(g) schematically show the state before release and the state after release for various cases the process of releasing in FIG. 4 has been executed. In FIGS. 5(a) to 5(g), the hatched portion shows the in-use region, the white portion indicates the unused region, and the spotted portion indicates the release target region. Further, Usage 0 indicates that image is the object for use, and Usage 1 denotes that software is the object for use.

FIG. 5(a) shows that both the neighboring regions positioned before and after the release target region of Usage 0 to be released are unused regions, and pertain to Usage 1. The usage of the release target region is changed from Usage 0 to Usage 1. Further, it is united with the neighboring regions, and is released as one unused region.

In this case, the usage of the release target region is changed to that of the neighboring regions, and then the release target region is released. Thus, the neighboring regions can be united with the release target region, with the result that a large unused region can be obtained. If the neighboring regions have the same usage and this usage is different from that of the release target region, a procedure is considered such a way that this release target region was acquired so as to cause fragmented regions. Accordingly, to minimize the fragmented region, the usage of the release target region is made to conform to the usage of the neighboring regions, whereby one unused region is acquired.

FIG. 5(b) shows that both the release target region of Usage 0 to be released and the neighboring regions are unused regions, and pertain to Usage 0. The Usage 0 of the release target region is kept unchanged. The release target region is united with the neighboring regions and is released as one unused region.

FIG. 5(c) represents that both the neighboring regions positioned before and after the release target region of Usage 0 to be released are the in-use region, and pertain to Usage 1. The usage of the release target region is changed from Usage 0 to Usage 1, and the release target region is released without being united with the neighboring regions.

In this case, the usage of the release target region is changed to the usage of the neighboring regions, and then the release target region is released. This increases the possibility that, when the neighboring region positioned before or after is released, the neighboring region is united to acquire a larger unused region.

To be more specific, if the neighboring regions have the same usage, and this usage is different from that of the release target region, a procedure is considered such a way that this release target region was acquired so as to cause fragmented regions. Accordingly, to minimize the fragmented region, the usage of the release target region is made to conform to the usage of the neighboring regions.

FIG. 5(d) shows that both the neighboring regions positioned before and after the release target region of Usage 0 to be released are unused regions, and pertain to Usage 0. The Usage 0 of the release target region is kept unchanged, and is released without being united to either of the neighboring regions.

FIG. 5(e) shows that both the neighboring regions positioned before and after the release target region of Usage 0 to be released are unused regions, and one of the neighboring regions pertains to Usage 1 while the other pertains to Usage 0. The Usage 0 of the release target region is kept unchanged, and is released after having been united to one of the neighboring regions that pertains to Usage 0.

FIG. 5(f) shows that one of the neighboring regions positioned before and after the release target region of Usage 0 to be released is an unused region and pertains to Usage 0, and the other is currently in use and pertains to Usage 1. The Usage 0 of the release target region is kept unchanged, and is released after having been united to the unused one of the neighboring regions that pertains to Usage 0.

FIG. 5(g) shows that one of the neighboring regions positioned before and after the release target region of Usage 0 to be released is an unused region and pertains to Usage 1, and the other is currently in use and pertains to Usage 0. The Usage 0 of the release target region is kept unchanged, and is released without being united to either of the neighboring regions.

In FIGS. 5(e) through (g), the neighboring regions positioned before and after the release target region have different usages. For example, in the case that when the memory region of Usage 0 is to be acquired, unused regions are searched from the top to the end of the memory to obtain the region, or when the memory region of Usage 1 is to be acquired, unused regions are searched from the end to the top of the memory to obtain the region, locations in the memory are separated by usage in such a way that the region of Usage 0 is concentrated at the top side of the memory and the region of Usage 1 is concentrated at the end side of the memory. Thus, when the memory region is to be released on the boundary thereof, one of the neighboring regions before and after the release target region pertains to Usage 0, while the other pertains to Usage 1.

In this case, by releasing as shown in FIGS. 5(e) through (g), the boundary between the separate locations for each usage can be adequately maintained. Further, the separate locations for each usage can be maintained without having to divide the memory for each usage on a fixed basis. This ensures a natural change in the position of the boundary in response to the amount of the memory required for each usage, and effective use of the memory region.

When the region currently in use is to be released and this region is used for image, the released region is overwritten with specific data such as "0" to ensure that the data having been written during the use will not be illegally referred to after release of this region. This arrangement is intended to enhance security. This processing is applied, for example, when releasing the memory.

Figure 6:
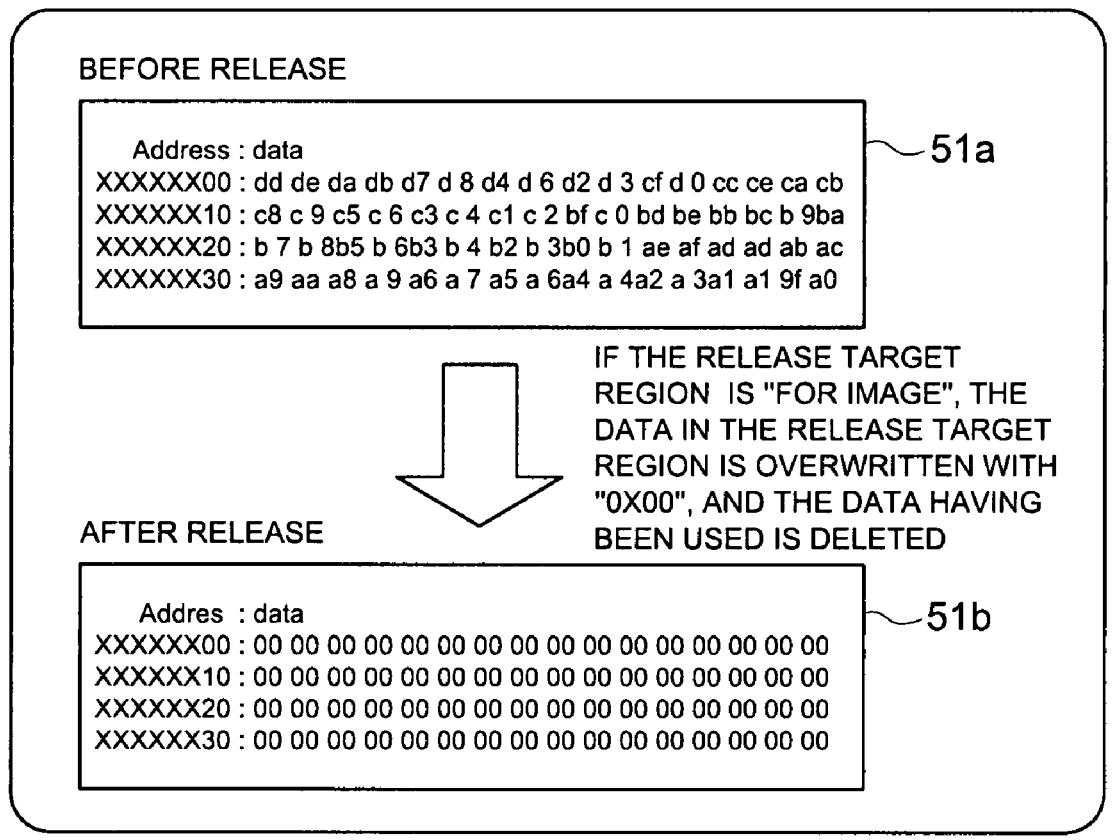
FIG. 6 is an explanatory diagram showing an example of the memory content when the memory region for image has been released.

FIG. 6 shows an example of the case wherein, when the memory region for image is released, all the regions 51a having been released are overwritten with specific data "0", and the data in use has been deleted (region 51b). It should be noted that the data used for overwriting is not restricted to "0". Other data, e.g., all "1s" can be used for this purpose. Without being restricted to the case where the region for image has been released, it is also possible to make such arrangements that the data in the region is deleted whenever the memory region has been released.

The following describes the cases wherein a region placed under boundary administration is included in the memory:

The data used on the system memory 15, particularly the data used for hardware control, the restriction of a boundary may be included in the address of the data to be handled. The boundary is administrated where a predetermined fixed length size of the data to be handled is used as a unit. Normally, several low-order bits of the head address of the unit region of the fixed length size are arranged to start with "0". For example, if the fixed length size of the unit region of the boundary is 4 Kbytes (4096 bytes), the boundary is arranged in such a way that twelve low-order bits of the head address of each unit region will start with "0".

Figure 7:
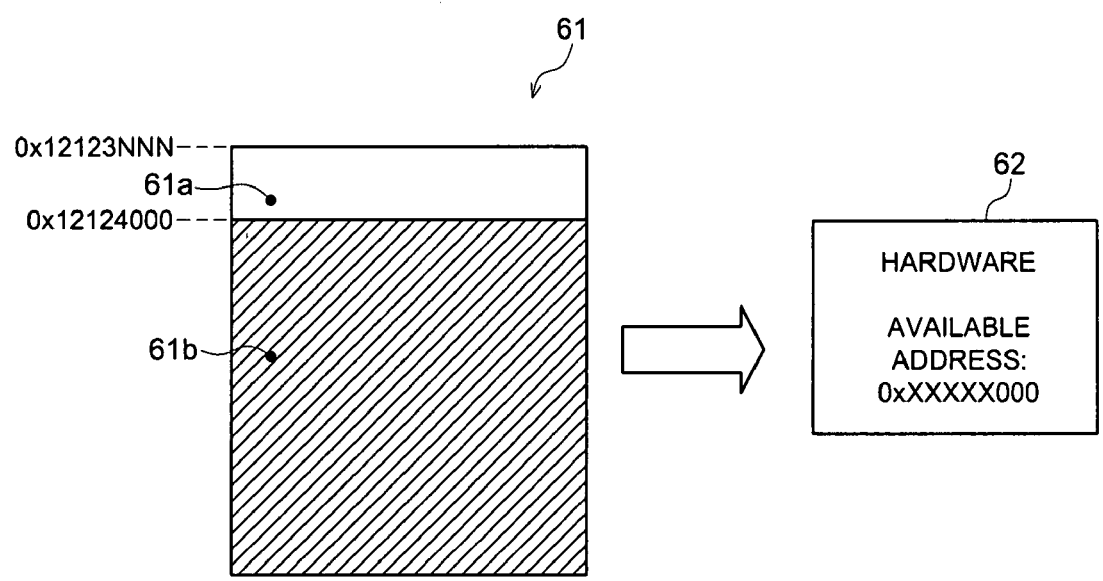
FIG. 7 is an explanatory diagram showing that the memory region administrated on the boundary is acquired at a given address.

As shown in FIG. 7, if the memory administrating function assigns the memory region 61 to the hardware that handles the data administrated by boundary without consideration given to the head address of the boundary, the hardware cannot use the region 61a from the top of the memory region 61 provided at a desired position to the head address of the boundary. This region will have to be wasted. Further, when the memory region is acquired, consideration must be given to the cases where the maximum useless region occurs, and the required size must be provided with some margin.

In the example of FIG. 7, the fixed length size of the boundary (unit region 62) of the hardware is 4 Kbytes, and twelve low-order bits of the head address must be "0". Thus, a useless region 61a of 0xNNN results from the head address 0x12123NNN of the memory region 61 having been acquired, and the region 61b that can be used by hardware is 0x12124000 and thereafter. Further, when a request is made for a memory region, the maximum useless region 61a is (4096-1) bytes, it is necessary to request acquisition of a size equal to or greater than the size obtained by adding this size to the required size.

Figure 8A:
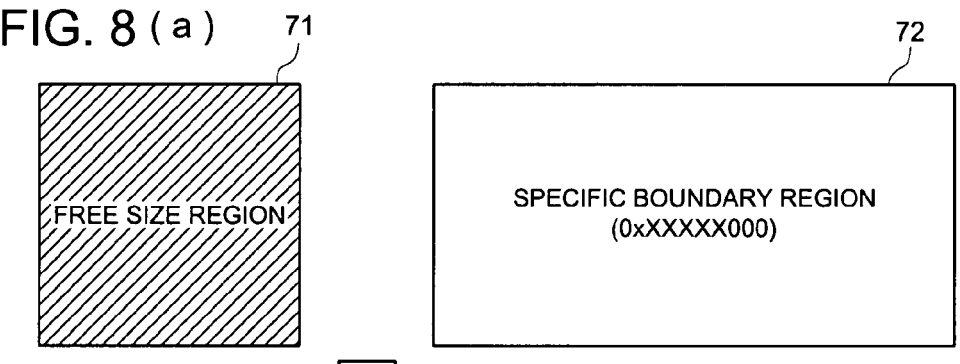
FIGS. 8(a) to 8(c) each is an explanatory diagram schematically showing acquisition and release of region when the memory is provided with a free size region and specific boundary region.

Thus, as shown in FIG. 8(a), a free size region 71 wherein a region of a desired size can be acquired from a desired address and a specific boundary region 72 of a fixed length size placed under boundary administration are assigned separately in the system memory 15 in advance on a permanent basis. When acquiring the memory region of a desired size, the memory region is acquired from a free size region 71. If acquiring a memory region according to the boundary, the memory region is acquired from the specific boundary region 72.

To determine which of the regions 71 and 72 a memory region should be acquired from, it can be determined by an argument of acquisition request (parameter), for example, or by automatic identification from the size of the memory region whose acquisition has been requested. In the case of automatic identification, for example, (1) if the size of the memory region whose acquisition has been requested agrees with an integral multiple of the fixed length size of the boundary, the memory region is acquired from the specific boundary region 72. Otherwise, it is acquired from the free size region 71. (2) If the size of the memory region whose acquisition has been requested does not exceed the fixed length size of the boundary, the memory region is acquired from the free size region 71. If it is equal to or greater than the fixed length size of the boundary, the memory region is acquired from the specific boundary region 72.

As described above, when the free size region 71 is separated from the specific boundary region 72, the memory region to be acquired from the free size region 71 cannot be acquired therefrom if almost entire free size region 71 has been used up. In this case, the free size region extension region 73 with the size conforming to the boundary of the specific boundary region 72 is acquired from the specific boundary region 72 so that this region is used by the source of request.

Figure 8B:
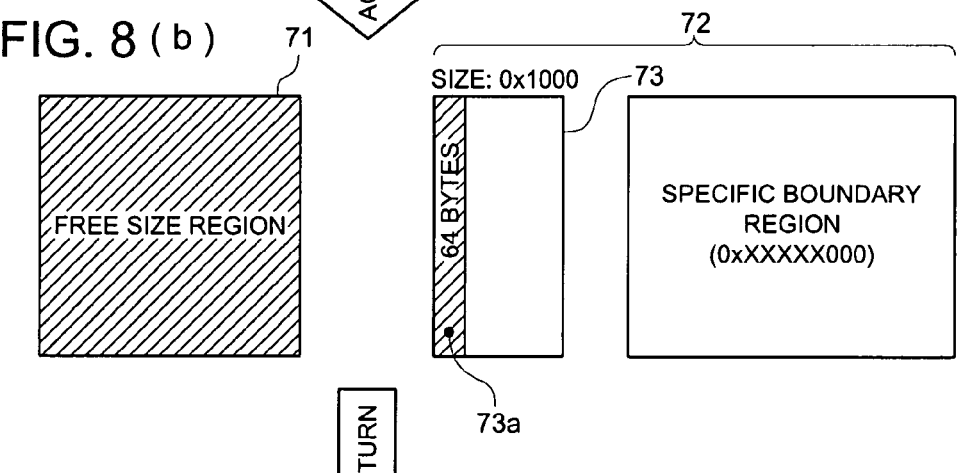
Figure 8C:
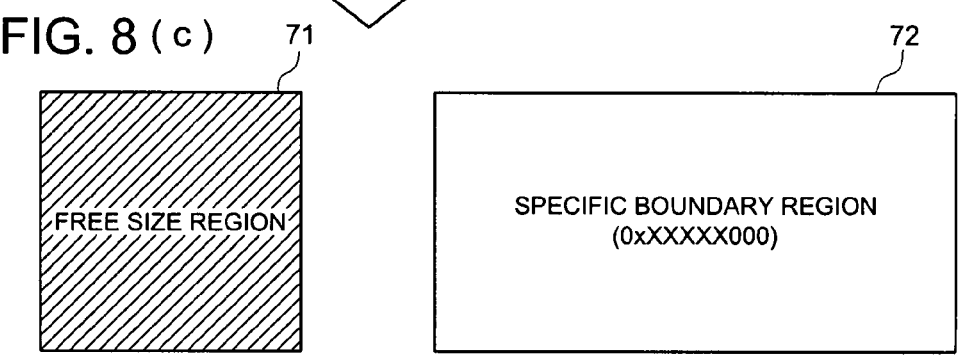
Figure 9:
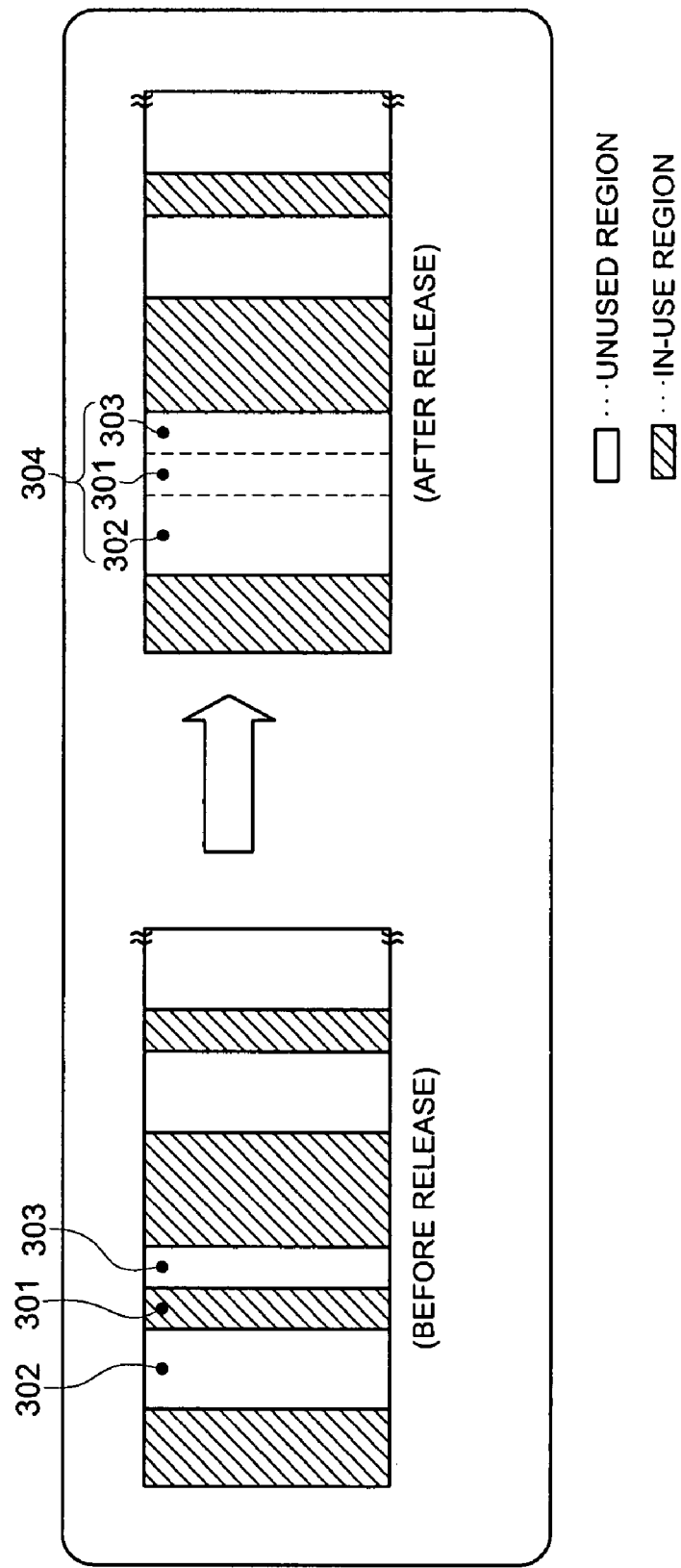
FIG. 9 is an explanatory diagram showing a conventional method of combining adjacent memory regions in the process of memory release.

In the example of FIG. 8(b), the size whose acquisition has been requested is 64 bytes. However, since the memory region of this size cannot be acquired from the free size region 71, the free size region extension region 73 with the minimum unit (4 Kbytes) of the boundary is acquired from the specific boundary region 72. The source of request uses only the 64 bytes (region 73a) out of the free size region extension region 73. As shown in FIG. 8(c), after use, the free size region extension region 73 is released as an unused region pertaining to the original specific boundary region 72.

According to this arrangement, the free size region 71 and specific boundary region 72 are to be separately utilized in response to the acquisition size under the normal condition, whereby the memory can be used so that the useless region 61a will not occur, as shown in FIG. 7. Further, if a necessary memory region cannot be acquired from the free size region 71, the specific boundary region 72 can be used temporarily as a substitute of the free size region 71. This arrangement eliminates that possibility that the memory region cannot be acquired due to the permanent separation between the free size region 71 and specific boundary region 72, despite the presence of the unused region of the required size as the system memory 15 as a whole. Thus, effective use of the memory is ensured.

It should be noted that the specific boundary region 72 is not restricted to the one type alone. It is possible to provide a plurality of types of boundary regions having different fixed length sizes. In this case, in response to the size whose acquisition has been requested, a decision should be made as to which of the boundary region and free size region 71 the region should be acquired from. To be more specific, when the size whose acquisition has been requested agrees with the fixed length size (or the integral multiple thereof) of any boundary, the agreed boundary region is selected for the sake of the source of acquisition.

The embodiments of the present invention have been described with reference to diagrams. It is to be expressly understood, however, that the present invention is not restricted thereto. The present invention can be embodied in a great number of variations with appropriate modification or additions, without departing from the technological spirit and scope of the invention claimed.

For example, in the embodiment, the memory administrating method of the present invention has been described with reference to the system memory 15 of the image forming apparatus 10. The present invention is also applicable to an apparatus or system of other structures that permit release and acquisition of a region from the memory.

In FIG. 4 of the embodiment, a decision is made on the change of usage of the release target region, and the required change is made. After that, a decision is made as to the possibility of combination with the neighboring regions. However, the decision procedure is not restricted to this method so long as the final result of decision is the same. It is also possible to make such arrangements that the change of usage and the possibility of combination are determined in a single step based on various conditions.

Memory usage has been described with reference to the examples for image and software without the present invention being restricted thereto. Three or more types of usages can be set. The state of release can be determined according to the memory usage time period, instead of usage. For example, Usage 1 in FIG. 4 and FIG. 5 is assigned to longer usage time period, whereas Usage 0 is assigned to shorter usage time period, whereby region can be released in the same manner as shown in FIG. 4 and FIG. 5.

What is claimed is:

1. A memory administrating method of administrating a memory divided into plural regions each of which consists of consecutive memory addresses, comprising steps of:
   providing each region of the plural regions with usage information; and
   when releasing a release target region currently being in use, determining a usage of the release target region based on the usage information of at least one of neighboring regions positioned before and after the release target region.

2. The memory administrating method described in claim 1, wherein the usage of the release target region and a uniting condition to unite the release target region with at least one of the neighboring regions are determined based on the usage information of the neighboring regions and status information indicating at least whether the status of the each memory region is currently "in-use" or "unused".

3. The memory administrating method described in claim 2, wherein when the usage information of each of the neighboring regions is the same to each other, the usage information of the release target region is made the same usage information with that of the neighboring regions, and the release target region is united with a neighboring region having a status information indicating "unused" among the neighboring regions.

4. The memory administrating method described in claim 2, wherein when the status information of both of the neighboring regions indicates "unused" and the usage information of both of the neighboring regions are the same with that of the release target region, the release target region and the neighboring regions are united as a single unused region, and
   when the status information of both of the neighboring regions indicates "unused" and the usage information of each of the neighboring regions is the same with each other and is different from that of the release target region, the usage information of the release target region is rewritten so as to become the same with that of the neighboring regions and the release target region and the neighboring regions are united as a single unused region.

5. The memory administrating method described in claim 2, wherein when the status information of both of the neighboring regions indicates "in-use" and the usage information of both of the neighboring regions are the same with that of the release target region, the release target region is released with the same usage information with that before being released, and
   when the status information of both of the neighboring regions indicates "in-use" and the usage information of each of the neighboring regions is the same with each other and is different from that of the release target region, the usage information of the release target region is rewritten so as to become the same usage information as that of the neighboring regions and the release target region is released.

6. The memory administrating method described in claim 2, wherein when the status information of both of the neighboring regions indicates "unused" and the usage information of one of the neighboring regions is the same as that of the release target region and the usage information of the other one of the neighboring regions is different from that of the release target region, the release target region is united with the one of the neighboring regions as a single unused region with the same usage information and the release target region is not united with the other one of the neighboring regions.

7. The memory administrating method described in claim 2, wherein when the status information of one of the neighboring regions indicates "unused", the status information of the other one of the neighboring regions indicates "in-use" and the usage information of the release target region is the same with that of the one of the neighboring regions, the release target region is united with the one of the neighboring regions with the same usage information.

8. The memory administrating method described in claim 2, wherein the usage of the release target region is determined based on the usage information of the neighboring regions, and thereafter the uniting condition to unite the release target region with the neighboring regions are determined based on the status information of the neighboring regions.

9. The memory administrating method described in claim 1, wherein when the release target region is released, the release target region is overwritten with specific data when the usage information of the release target region is for image data.

10. The memory administrating method described in claim 1, wherein the memory is divided into plural administrating regions based on presence or absence of a boundary or a fixed length size of a boundary, and when obtaining a region from the plural regions, an administrating region of a requested region for the region is selected in accordance with a requested size.

11. The memory administrating method described in claim 1, wherein when an unused region having the requested size is not obtainable from the selected administrating region, an unused region is obtained from another administrating region in accordance with the boundary of the another administrating region.

* * * * *